United States Patent Office 3,256,202
Patented June 14, 1966

3,256,202
SURFACE-ACTIVE AGENTS AND DETERGENT
COMPOSITIONS
Herbert D. Weiss, Otto Gellner, and George W. Panzer,
Baltimore, Md., assignors to Alcolac Chemical Corporation, a corporation of Maryland
No Drawing. Filed June 1, 1964, Ser. No. 371,799
26 Claims. (Cl. 252—138)

This application is a continuation-in-part of applications Serial No. 150,133, filed November 6, 1961, and Serial No. 150,191, filed November 6, 1961.

This invention relates to improved surface-active agents, to mixtures of aliphatic hydrocarbons sulfates which are especially advantageous as emulsifiers in emulsion systems, to detergent compositions, and particularly to detergent compositions combining low-foaming properties with high activity cleaning abilities. The invention also relates to low-foaming, high-cleansing detergent compositions comprising mixtures of aliphatic hydrocarbon sulfate salts.

In emulsion polymerization processes, anionic surface-active compounds may be employed to provide the desired emulsion systems. Some of the more economic anionic emulsifiers employed in polymerization processes are the mixtures of salts of sulfated alkyl alcohol mixtures derived from naturally occurring substances such as coconut oil. The alkyl sulfate mixtures thereby obtained usually are characterized by an average carbon atom content per molecule of from about 11 to about 15 and contain a predominance of lauryl and myristyl sulfates with smaller amounts of octyl, decyl, cetyl, and stearyl sulfates. These alkyl sulfate mixtures, such as commercial sodium lauryl sulfate which has average carbon atoms per molecule of about 13, display excellent emulsifying properties. When such alkyl sulfate mixtures are employed as emulsifiers in emulsion polymerization systems, however, the final polymer latices which result frequently do not exhibit the desired stability. In many instances, the final polymer latex is unsuitable for utilization due to a tendency of the latex to undergo gel formation.

In emulsion polymerization reactions and in commercial polymer dispersions it is generally desirable that the particle size of the dispersed polymeric material be in the range of from about 0.05 to about 0.30 micron. Polymer emulsions having a dispersed phase having particle sizes in this range generally are characterized by greater stability and homogeneity than emulsions containing dispersed particles of substantially larger size. With the utilization of prior art alkyl sulfate salts as emulsifiers, such as commercial sodium lauryl sulfate, relatively large concentrations of the emulsifiers or the presence of non-ionic surface-active compounds are required to achieve the desired dispersed particle sizes. Therefore, it often has been found necessary to employ more expensive emulsifying agents having dispersing properties greater than the conventional alkyl sulfate salts in order to obtain the desired particle size and stability of the dispersed polymer.

In addition, conventional mixtures of alkyl sulfates containing major amounts of lauryl and myristyl sulfates demonstrate undersirably high foaming characteristics, and therefore, present foaming problems in many polymerization systems.

Accordingly, it is an object of the present invention to provide a surface-active material characterized by certain surface-active properties which are more desirable than those of alkyl sulfate salts or mixtures thereof heretofore available.

It is an additional object of the present invention to provide surface-active agents which are derived from sulfated aliphatic hydrocarbon alcohols and characterized by enhanced dispersing properties as compared with the alkyl sulfate salts and mixtures thereof conventionally employed as emulsifiers in emulsion polymerization systems.

It is another object of the present invention to provide surface-active agents having excellent emulsifying properties which are derived from sulfated aliphatic hydrocarbon alcohols and which effect appreciably less foaming in aqueous systems than alkyl sulfate salts and mixtures thereof conventionally employed as emulsifiers.

A further object of the present invention is to provide a surface-active agent derived from sulfated aliphatic hydrocarbon alcohols and characterized by properties which render it especially adapted for utilization as an emulsifier in emulsion polymerization systems.

Yet another object of the present invention is to provide a surface-active agent derived from sulfated aliphatic hydrocarbon alcohols and which is especially adapted for utilization as an emulsifier in emulsion polymerization systems to provide stable polymer dispersions characterized by a particle size of between about 0.05 and 0.30 micron.

Another object of the present invention is to provide a surface-active agent derived from sulfated aliphatic hydrocarbon alcohols and which advantageously may be utilized as an emulsifier in emulsion polymerization systems to provide stable, relatively low-foaming polymer dispersions.

The widespread modern use of home laundry machines and home dishwashing machines has created a need for detergents combining high cleaning ability with low foaming. Whereas foam in the past has generally been considered a mark of good cleansing ability, foam is extremely detrimental in these applications. Thus in dishwashing the existence of foam makes it difficult to remove detergent residues from the articles being cleaned resulting in spotting of the article. In home laundry machines excess foam limits the amount of detergent which may be applied to the water, excessive amounts causing foam to run out of the machine forcing the operator to use less detergent than necessary for optimum cleaning action. Further, those types of laundry machines having a canted rotary drum with ribs projecting internally from the cylindrical wall rely for their cleaning action upon the tumbling action imparted to the clothes by the ribs whereby the clothes are lifted out of the water and fall back in. The existence of foam acts as a cushion completely defeating the purpose of the tumbling action in assisting the cleaning of the clothes. Accordingly, the art for some time has been searching for detergent compounds to solve this problem. Nonionics often possess low foaming properties but, in general, do not equal the cleaning activity of the better anionics.

Accordingly, the art has resorted to the use of depressant agents specifically added to the anionic detergent to reduce the foaming properties thereof. Typical of this art is U.S. 2,954,348 to Schwoeppe and the patents and applications therein referred to. The use of foam depressants which add nothing to the cleaning ability of the anionic and add to the cost of the detergent obviously does not constitute a satisfactory solution.

Therefore, it is also an object of the present invention to provide a detergent composition utilizing anionic detergents having low foaming properties and without the necessity for a foam depressant. It is another object of the present invention to provide a detergent composition containing a mixture of alkyl sulfates characterized by greatly depressed foaming properties and high cleaning abilities.

Yet another object of the invention is to provide an anionic detergent composition which may be employed in drum type washers and other home dishwashing and clothes washing appliances without excessive foaming.

SURFACE-ACTIVE AGENT

A surface-active agent composition which satisfies the objects of the present invention comprises a water-soluble mixture of sulfated aliphatic hydrocarbon alcohols having an average carbon atom content per molecule of from about 7 to about 22 and consisting essentially of at least one salt of a sulfated lower aliphatic alcohol having from 1 to 4 carbon atoms and at least one salt of a sulfated higher aliphatic alcohol having at least about 16 carbon atoms, said lower aliphatic sulfate salt being present in an amount of at least about 5 mol percent of said sulfate salt mixture.

The salts of sulfated aliphatic alcohols contemplated for utilization in the surface active compositions of the present invention are limited to those aliphatic sulfate salts wherein the organic aliphatic chain is a hydrocarbon aliphatic chain. Aliphatic sulfate salts referred to hereinafter will be understood to be aliphatic hydrocarbon sulfate salts.

The lower aliphatic sulfate salts contemplated for utilization in the surface active compositions of the invention are the salts of sulfated lower aliphatic alcohols containing from 1 to 4 carbon atoms. The lower aliphatic sulfates suitably may be straight or branched in chain structure and saturated or unsaturated in nature. Although sulfate salts of secondary and tertiary alcohols suitably may be employed, salts of sulfated primary aliphatic alcohols provide the preferred lower molecular weight components of the sulfate salt mixtures of the invention.

The particular lower aliphatic sulfate salts which are contemplated for utilization are the salts formed from suitable sulfated lower aliphatic alcohols and inorganic and organic proton acceptors. Suitable salts include the salts of alkali metals such as lithium, sodium, and potassium; salts of alkaline earth metals such as calcium and magnesium; and salts of nitrogen-containing compounds such as ammonia, diethanolamine, triethanolamine, pyridine, morpholine and diethylcyclohexylamine.

Specific compounds which are contemplated for utilization as the lower molecular weight sulfate salts include, without limitation, sodium methyl sulfate, triethanolamine methyl sulfate, sodium ethyl sulfate, potassium n-propyl sulfate, sodium n-butyl sulfate, and lithium i-butyl sulfate. The lower aliphatic sulfate salts may be employed singly or in combination.

The higher molecular weight aliphatic sulfate salts which are contemplated for utilization in the surface active compositions of the present invention are salts of sulfated higher aliphatic alcohols having at least about 16, and may be in the range of about 16 to about 30, preferably from about 16 to about 22, carbon atoms in the aliphatic chain, which salts are water soluble, per se, or soluble when employed in combination with the salts of the lower molecular weight constituent of the surface-active mixtures of the invention. The higher aliphatic sulfate salts may be straight or branched chain in structure and contain saturated or unsaturated carbon chains.

The higher molecular weight components of the aliphatic sulfate salt mixtures of the invention are the salts formed by reaction of suitable sulfated higher aliphatic alcohols and inorganic and organic proton acceptors. Such salts include the salts of alkali metals such as lithium, sodium, and potassium; salts of alkaline earth metals such as calcium and magnesium; and salts of nitrogen-containing compounds such as ammonia, diethanolamine, triethanolamine, pyridine, morpholine and diethylcyclohexylamine. Specific salts which may be employed as the higher aliphatic sulfate salt in the compositions of the invention include, without limitation, sodium cetyl sulfate, ammonium cetyl sulfate, triethanolamine cetyl sulfate, sodium i-hexadecyl sulfate, sodium stearyl sulfate, lithium stearyl sulfate, magnesium stearyl sulfate, diethanolamine stearyl sulfate, sodium i-eicosyl sulfate, sodium oleyl sulfate, potassium arachidyl sulfate, and sodium behenyl sulfate. The higher aliphatic sulfates may be employed singly or in the combination in the surface-active compositions of the invention. Suitable mixtures of such salts include salts of sulfated $C_{16}$ to $C_{20}$ aliphatic hydrocarbon alcohols derived from vegetable or animal origins such as tall oil, sperm oil, and tallow fats. Suitable higher aliphatic alcohols may also be prepared synthetically, such as from petrochemicals by the oxo-reaction.

The aliphatic sulfate salts contemplated for utilization in the invention are produced by the sulfation of suitable aliphatic hydrocarbon alcohols in accordance with any of the conventional sulfation processes such as those employing chlorosulfonic acid, sulfuric acid, and the like, followed by neutralization of the sulfated derivatives with a base. The lower and higher molecular weight components of the sulfate salt mixtures of the invention may be produced by the sulfation of the aliphatic alcohol derivatives separately prior to their combination; alternatively, the lower and higher molecular weight alcohols to be employed to produce the surface active compositions of the invention initially are combined in the requisite amounts; and the resulting mixture then is subjected to sulfation conditions. In a preparation wherein sulfation is carried out on a mixture of the lower and higher molecular weight alcohols, an excess of the more volatile alcohols equal to the amounts which are lost during the sulfation by evaporation should be introduced in order to insure the desired final composition.

The lower and higher molecular weight aliphatic sulfate salts are combined in such proportions as to provide a water-soluble mixture of aliphatic hydrocarbon alcohol derivatives having an average carbon atom content per molecule in the range of from about 7 to about 22, preferably from about 9 to about 16, and a lower aliphatic sulfate salt content of at least about 5 mol percent, preferably at least about 10 mol percent. Of course, it will be understood that the upper limit on the amount of the lower molecular weight constituent in a given surface-active composition of the invention will be dictated by the limitation on the average carbon atom content per molecule of the composition. Compositions which are more preferred are those characterized by a lower molecular weight constituent which is less than about 85 mol percent of the sulfate salt mixture.

Aliphatic sulfate salt mixtures of the invention wherein the amount of lower aliphatic sulfate salt present is between about 5 and about 10 mol percent display dispersing properties which are comparable or slightly better than conventionally employed alkyl sulfate salts. These aliphatic sulfate salt mixtures of the invention, however, exhibit a greatly reduced tendency to foam as compared to the alkyl sulfate salts heretofore available, such as commercial sodium lauryl sulfate.

The sulfate salt mixtures of the invention containing over about 10 mol percent of the lower aliphatic salt constituent, in addition to having valuable low foaming characteristics, have improved surface-active properties which can be utilized, inter alia, in the formation of stable polymer dispersions having the requisite polymer particle sizes.

Sulfate salt mixtures produced according to the invention have a difference between the average carbon atom content per molecule of the higher molecular weight component and the average carbon atom content per molecule of the lower molecular weight component of at least about 12. For salt mixtures wherein the cation is the same, the surface active properties, especially the low foaming properties, become progressively better as the spread in the average carbon atom content per molecule between the lower and higher molecular weight constituents is increased. Surface active compositions of the invention which have the more preferred surface active characteristics are those in which the spread in the average carbon atom content per molecule between the lower and higher molecular weight constituents is in the range of from about 15 to about 21.

Mixtures formed from the lower and higher molecular weight aliphatic sulfate salts employed in the invention and characterized by compositions which fall outside of the recited ranges do not exhibit the desired valuable surface active properties. Such sulfate salt mixtures fail to provide polymer dispersion systems having the desired stability and depressed foaming characteristics.

By virtue of their excellent emulsifying properties, the surface active compositions of the present invention are particularly adapted for utilization as emulsifiers in emulsion polymerization systems. Polymeric materials contemplated to be produced by a polymerization process employing the surface active mixtures of this invention are any polymers derived from ethylenically unsaturated monomeric material which suitably may be polymerized in an emulsion system. Such polymeric materials include, without limitation, homopolymers, such as polymethylmethacrylate, polybutylmethacrylate, polybutadiene, polystyrene, polyisoprene, polyvinyl chloride, polyvinylidene chloride, and polyvinyl acetate; copolymers, such as ethylacrylate-methylmethacrylate, 2-ethylhexylacrylate-methylmethacrylate, butylacrylate-acrylonitrile, methylmethacrylate-styrene, vinylidene chloride-methylacrylate, ethylmethacrylate-itaconate, butylacrylate-methylitaconate, methylethacrylate-maleic acid, methylacrylate-ethylmaleate, vinyl chloride-vinyl acetate, styrene-butadiene, and isoprene-styrene copolymers; terpolymers, such as butoxymethacrylate-styrene-methylmethacrylate, ethylacrylate-styrene-methacrylic acid, ethylacrylate-styrene-itaconic acid, and ethylacrylate-methylmethacrylate-methacrylic acid terpolymers; and the like.

In the utilization of the surface active compositions of the present invention as emulsifiers in emulsion polymerization systems, ethylenically unsaturated monomeric material is contacted in an aqueous medium in the presence of a polymerization catalyst and from about 0.5 to about 5%, preferably from about 0.75 to 3%, by weight of total monomeric material.

Suitable catalyst systems include any of the activation systems which may be suitably employed in the emulsion polymerization of vinyl-type monomers. Such systems include those utilizing ultraviolet activations and those employing compounds such as azo-type catalysts, persulfates, peroxides, hydroperoxides, and the like. Specific polymerization catalysts which are preferred include, without limitation, ammonium persulfate, potassium persulfate, benzoyl peroxide, cumene hydroperoxide, tertiarybutyl hydroperoxide, and hydrogen peroxide. Redox-type catalyst systems are contemplated, and indeed are preferred for low-temperature polymerization processes.

Although the surface active compositions of the invention are particularly adapted for utilization as emulsifiers in polymerization systems, due to their excellent dispersing properties and low-foaming characteristics, the sulfate salt mixtures of the invention are also valuable as dispersants for dyes, pigments, carbon black lime soap, and pesticides. The surface active mixtures of the invention also advantageously may be utilized in the preparation of surfactants employed, inter alia, in metal cleaning and cutting, automatic dishwashing, commercial and home laundering, textile and leather treating, and the like.

The invention having been generally described, the following examples are given to illustrate various embodiments of the surface active compositions of the invention and to provide comparisons of the dispersing and foaming properties of the surface active compositions of the invention with those of a conventionally employed aliphatic sulfate salt mixture, commercial sodium lauryl sulfate. The examples are given for illustration purposes only and are not intended in any way to limit the scope of the invention. Unless otherwise specified, the percentage of an ingredient in a composition referred to in the examples is in mol percent. In the examples wherein it is indicated that a sulfate salt mixture contains "tallow" sulfate, it will be understood that the "tallow" refers to a cetyl-stearyl mixture which has a mol ratio of $C_{16}$ to $C_{18}$ components of about 0.54 and has been derived from hydrogenated tallow.

Example I

To determine the foaming characteristics of commercial sodium lauryl sulfate, 0.1, 0.25, and 0.50% by weight solutions of commercial sodium lauryl sulfate were prepared in water characterized by a hardness of 300 p.p.m. and were tested in accordance with the following procedure (Commercial sodium lauryl sulfate is a mixture of sulfated fatty alcohol salts which is characterized by a composition containing about 2% 10-carbon atom, 60% 12-carbon atom, 25% 14-carbon atom, 11.5% 16-carbon atom, and 0.5% 18-carbon atom molecules and having an average carbon atom content per molecule of about 13):

A measured 60 cc. portion of each solution was introduced into a graduated cylinder, and the cylinder was placed in a vertical position in a rack which was rotatable in a vertical plane. The rack was rotated at 50 r.p.m. for 1 minute to subject the solution to agitation. At the end of the agitation period the cylinder was removed from the rack, and the total volume of the material in the cylinder was recorded. The amount of the volume attributable to foam was determined by subtracting the original volume, 60 cc., from the recorded volume.

The test results are reported in Table 1.

TABLE 1

| Run | Emulsifier | Conc., percent | Foam Volume (cc.) |
|---|---|---|---|
| 1 | Sodium lauryl sulfate | 0.1 | 15 |
| 2 | ----do---- | 0.25 | 296 |
| 3 | ----do---- | 0.50 | 300+ |

Example II

In order to compare the foaming characteristics of a surface active composition of the invention with those of commercial sodium lauryl sulfate, the procedure of Example I was repeated with the exception of substituting for the commercial sodium lauryl sulfate, in turn, mixtures of sodium salts of lower molecular weight alkyl sulfates and higher molecular weight alkyl sulfates combined to obtain an average carbon atom contents per molecule of about 13. The results of these tests are set forth in Table 2, with the salts being designated by their respective alkyl radicals.

TABLE 2

| Run | Emulsifier | Mol, percent | $C_{av.}$ | Conc., percent | Foam Volume (cc.) |
|---|---|---|---|---|---|
| 4 | Methyl:tallow | 26:74 | 13 | 0.1 | 0 |
| 5 | do | 26:74 | 13 | 0.25 | 0 |
| 6 | do | 26:74 | 13 | 0.50 | 80 |
| 7 | Ethyl:tallow | 21:79 | 13.8 | 0.1 | 0 |
| 8 | do | 21:79 | 13.8 | 0.25 | 15 |
| 9 | do | 21:79 | 13.8 | 0.50 | 100 |
| 10 | n-Propyl:tallow | 25:75 | 13.5 | 0.1 | 0 |
| 11 | do | 25:75 | 13.5 | 0.25 | 20 |
| 12 | do | 25:75 | 13.5 | 0.50 | 110 |
| 13 | n-Butyl:tallow | 34:66 | 12.5 | 0.1 | 0 |
| 14 | do | 34:66 | 12.5 | 0.25 | 25 |
| 15 | do | 34:66 | 12.5 | 0.50 | 125 |
| 16 | Methyl:arachidyl | 38:62 | 12.8 | 0.1 | 0 |
| 17 | do | 38:62 | 12.8 | 0.25 | 20 |
| 18 | do | 38:62 | 12.8 | 0.50 | 120 |
| 19 | Ethyl:oleyl | 31:69 | 13 | 0.1 | 0 |
| 20 | do | 31:69 | 13 | 0.25 | 0 |
| 21 | do | 31:69 | 13 | 0.50 | 50 |
| 22 | n-Butyl:behenyl | 51:49 | 12.8 | 0.1 | 0 |
| 23 | do | 51:49 | 12.8 | 0.25 | 50 |
| 24 | do | 51:49 | 12.8 | 0.50 | 0 |
| 25 | Methyl:n-butyl:tallow | 11:17:72 | 13 | 0.1 | 30 |
| 26 | do | 11:17:72 | 13 | 0.25 | 0 |
| 27 | do | 11:17:72 | 13 | 0.50 | 130 |

It will be noted that the compositions of the invention display appreciably lower foaming properties than corresponding amounts of commercial sodium lauryl sulfate.

*Example III*

To determine the effect of varying the relative proportions of the lower and higher molecular weight constituents and the average carbon atom contents of the sulfate salt mixtures of the present invention, the general procedure of Example I was repeated for an emulsifier concentration, about 0.50% by weight, with the exception of substituting for commercial sodium lauryl sulfate various combinations of sodium sulfate salts of the invention and varying the composition and average carbon atom content per molecule of the combinations above a minimum of about 7.0.

The results of the tests are set forth in Table 3 with the salts being designated by their respective radicals.

In order for a complete indication of the results of the tests to be given, some of the data listed in Table 2, where appropriate, is repeated in Table 3.

TABLE 3

| Run | Emulsifier | Mol, percent | $C_{av.}$ | Foam Volume (cc.) |
|---|---|---|---|---|
| 28 | Methyl: tallow | 5:95 | 16.1 | 90 |
| 29 | do | 10:90 | 15.3 | 85 |
| 30 | do | 26:74 | 13.0 | 80 |
| 31 | do | 57:43 | 7.0 | 75 |
| 32 | Ethyl: tallow | 9:91 | 15.6 | 100 |
| 33 | do | 21:79 | 13.8 | 100 |
| 34 | do | 38:62 | 11.3 | 110 |
| 35 | do | 51:49 | 9.3 | 110 |
| 36 | n-Propyl: tallow | 25:75 | 13.5 | 110 |
| 37 | do | 35:65 | 11.1 | 100 |
| 38 | do | 49:51 | 10.1 | 60 |
| 39 | do | 60:40 | 8.6 | 60 |
| 40 | n-Butyl: tallow | 20:80 | 14.6 | 130 |
| 41 | do | 34:66 | 12.5 | 125 |
| 42 | do | 40:60 | 11.8 | 135 |
| 43 | do | 43:57 | 11.4 | 135 |
| 44 | do | 52:48 | 10.2 | 125 |
| 45 | do | 74:26 | 7.0 | 60 |
| 46 | n-Butyl: tallow | 30:70 | 16.6 | 50 |
| 47 | do | 51:49 | 12.8 | 50 |
| 48 | do | 58:42 | 11.6 | 50 |
| 49 | do | 70:30 | 9.4 | 50 |
| 50 | do | 83:17 | 7.0 | 50 |

It will be noted that the solutions of the composition of the invention demonstrated appreciably less foaming than the corresponding solutions of commercial sodium lauryl sulfate.

*Example IV*

The procedure of Example I was repeated with the exception of utilizing in place of commercial sodium lauryl sulfate a mixture of lithium ethyl sulfate and lithium tallow sulfate having an average carbon atom content per molecule of about 13. The results of the tests are set out in Table 4.

TABLE 4

| Run | Emulsifier | Mol, percent | Conc., percent by weight | Foam Volume (cc.) |
|---|---|---|---|---|
| 51 | Ethyl:tallow | 28:72 | 0.1 | 0 |
| 52 | do | 28:72 | 0.25 | 0 |
| 53 | do | 28:72 | 0.50 | 6 |

It will be noted the lithium salt mixtures of the invention also are characterized by appreciably lower foaming properties than commercial sodium lauryl sulfate.

*Example V*

The procedure of Example I was repeated with the exception of substituting for commercial sodium lauryl sulfate a mixture of magnesium i-propyl sulfate and magnesium tallow sulfate having an average of about 13 carbon atoms per molecule. The results of the tests are set out in Table 5.

TABLE 5

| Run | Emulsifier | Mol, percent | Conc., percent by weight | Foam Volume (cc.) |
|---|---|---|---|---|
| 54 | i-Propyl:tallow | 30:70 | 0.1 | 0 |
| 55 | do | 30:70 | 0.25 | 15 |
| 56 | do | 30:70 | 0.50 | 120 |

In all instances it will be noted that at all concentrations the magnesium salt mixture of the invention exhibited less foam production than corresponding concentrations of commercial sodium lauryl sulfate.

*Example VI*

In order to determine the foaming and dispersing properties of commercial sodium lauryl sulfate having an average of 13 carbon atoms per molecule in emulsion polymerization systems, commercial sodium lauryl sulfate was employed as the emulsifier in an emulsion polymerization of ethyl acrylate and styrene, in accordance with the following procedure, and the resulting dispersion was tested for foam production and polymer particle size.

Approximately 100 parts of water were introduced into a suitable reaction vessel, and the vessel was purged with nitrogen for about 15 minutes. About 2 parts of commercial sodium lauryl sulfate were added to the vessel and dissolved. About 20 parts of a mixture consisting of ethyl acrylate, styrene, and methacrylic acid in a ratio of 70:29:1, respectively, were then added to the reaction vessel. A dispersion of the monomers was formed upon the addition with stirring of a sufficient amount of water to lower the monomer content of the mixture to about 15%. The temperature in the reaction vessel was adjusted to between about 45° and about 55° C., and the vessel was again purged with nitrogen. After the mixture was subjected to stirring for about 5 minutes, about 0.5 part of ammonium persulfate and about 0.08 part of sodium metabisulfite were introduced into the dispersed mixture to initiate the polymerization reaction. After the temperature of the reaction mixture had risen about 4° or 5° C., an additional 80 parts of an ethyl acrylate-styrene-methacrylic acid mixture of the above stated proportions and about 0.32 part of additional sodium metabisulfite were added to the reaction mixture in increments, the addition extending over a period of from about 60 to about 90 minutes. During the addition of these materials the temperature of the reaction mixture was maintained in the range of from about 70° to about 75° C. The reaction mixture was then held at a temperature in the range of from about 70° to about 75° C. for about 30 minutes to allow the polymerization reaction to go to completion. The resulting polymer dispersion was then cooled to room temperature and neutralized to a pH in the range of from about 8 to about 9 with ammonium hydroxide.

The finished polymer dispersion was then adjusted to a solids content of about 7% by weight by the addition of a requisite amount of water. A measured 100 cc. portion of the dispersion was then subjected to agitation in a Waring blender following a schedule of about 30 seconds at 8,000 r.p.m. and about 2.5 minutes at about 15,000 r.p.m. The blended dispersion was removed carefully to a 1,000 cc. graduated cylinder wherein a volume of material amounting to 420 cc. was observed. Accordingly, 320 cc. of foam was produced.

The particle size of the solid materials in the dispersed phase was observed to be in the range of from about 0.08 to about 0.2 micron.

*Example VII*

In order to determine the foaming and dispersing characteristics of the surface above compositions of the present invention in emulsion polymerizations the procedure of Example VI was repeated with the exceptions of substituting for commercial sodium lauryl sulfate, in turn, the surface active compositions of the invention set out in Example II, these mixtures having average carbon atom contents per molecule of about 13.

The results of these tests are set forth in Table 6 with the salts being designated by their alkyl radicals.

TABLE 6

| Emulsifier | Mol, percent | $C_{av.}$ | Foam Volume (cc.) | Polymer Part. Size (micr.) |
|---|---|---|---|---|
| Ethyl:tallow | 21:79 | 13.8 | 170 | |
| n-Propyl:tallow | 25:75 | 13.5 | 200 | |
| n-Butyl:tallow | 34:66 | 12.5 | 210 | 0.05–0.2 |
| Methyl:arachidyl | 38:62 | 12.8 | 210 | 0.05–0.08 |
| Ethyl:oleyl | 31:69 | 13.0 | 130 | |
| n-Butyl:behenyl | 51:49 | 12.8 | 130 | |
| Methyl:n-butyl:tallow | 11:18:72 | 13 | 220 | 0.05–0.2 |

*Example VIII*

To determine the effect of varying the relative proportions of the lower and higher molecular weight constituents and the average carbon atom contents of the sulfate salt mixtures of the invention when employed in emulsion polymerizations, the procedure of Example VI was repeated with the exception of substituting for commercial sodium lauryl sulfate, in turn, each of the combinations of sodium sulfate salts of the invention set forth in Table 3 in Example III and varying the composition and average carbon atom content per molecule of the combinations above a minimum of about 7.0.

The results of the tests are set forth in Table 7 with the salts being designated by their respective radicals.

In order for a complete indication of the results of the tests to be given, some of the data listed in Table 6, where appropriate, is repeated in Table 7.

TABLE 7

| Emulsifier | Mol, percent | $C_{av.}$ | Foam Volume (cc.) |
|---|---|---|---|
| Methyl:tallow | 5:95 | 16.1 | 210 |
| Do | 10:90 | 15.3 | 200 |
| Do | 26:74 | 13.0 | 190 |
| Do | 57:43 | 7.0 | 180 |
| Ethyl:tallow | 9:91 | 15.6 | 170 |
| Do | 21:79 | 13.8 | 170 |
| Do | 38:62 | 11.3 | 160 |
| Do | 51:49 | 9.3 | 160 |
| n-Propyl:tallow | 25:75 | 13.5 | 200 |
| Do | 35:65 | 11.1 | 190 |
| Do | 49:51 | 10.1 | 130 |
| Do | 60:40 | 8.6 | 130 |
| n-Butyl:tallow | 20:80 | 14.6 | 220 |
| Do | 34:66 | 12.5 | 210 |
| Do | 40:60 | 11.8 | 230 |
| Do | 43:57 | 11.4 | 230 |
| Do | 52:48 | 10.2 | 230 |
| Do | 74:26 | 7.0 | 130 |
| n-Butyl:behenyl | 30:70 | 16.6 | 130 |
| Do | 51:49 | 12.8 | 130 |
| Do | 58:42 | 11.6 | 130 |
| Do | 70:30 | 9.4 | 130 |
| Do | 83:17 | 7.0 | 130 |

*Example IX*

The procedure of Example VI was again repeated with the exception of substituting for commercial sodium lauryl sulfate, in turn, three combinations of sodium alkyl sulfates having average carbon atom contents per molecule in the range of from about 3.5 to about 5.0.

The results of these tests are set out in Table 8.

TABLE 8

| Emulsifier | Mol, Percent | $C_{av.}$ | Nature of Polymer Dispersion |
|---|---|---|---|
| Methyl: tallow | 75.25 | 5.0 | About 30% coagulated. |
| Do | 84.16 | 3.5 | Polymerization failed. |
| n-Butyl:tallow | 92.8 | 5.0 | About 30% coagulated. |
| Do | 95.5 | 4.6 | Polymerization failed. |
| n-Butyl:behenyl | 94.6 | 5.0 | About 30% coagulated. |

It will be noted that in contrast to the polymerizations conducted employing emulsifiers having average carbon atom contents per molecule greater than about 7, the polymerizations attempted using the emulsifiers set out in Table 8 were unsuccessful in providing the desired polymer dispersions.

*Example X*

The procedure of Example VI was repeated with the exceptions of (1) substituting for the commercial sodium lauryl sulfate a mixture consisting of about 30% sodium n-propyl sulfate and about 70% sodium cetyl sulfate and having an average of about 12 carbon atoms per molecule, and (2) substituting for the monomer mixture of Example VI a monomer mixture consisting of ethyl acrylate, methylmethacrylate, and methacrylic acid in a ratio of 20:79:1. The foam production in this case was observed to be about 210 cc, and the particle size of the dispersed solids was observed to be in the range of from about 0.05 to about 0.08 microns.

*Example XI*

The procedure of Example VI was repeated with the exceptions of (1) substituting for commercial sodium lauryl sulfate a mixture consisting of about 33% sodium methyl sulfate and 66% sodium behenyl sulfate combined to obtain an average of about 15 carbon atoms per molecule, and (2) substituting a monomer mixture consisting of ethyl acrylate, methylmethacrylate and methacrylic acid in a ratio of 79:20:1 for the monomer mixture. A foam production of about 140 cc. and a dispersed phase average particle size in the range of from about 0.05 to about 0.2 micron were obtained.

*Example XII*

The procedure of Example VI was repeated with the exception of substituting for the commercial sodium lauryl sulfate a mixture consisting of about 66% magnesium decyl sulfate and about 34% magnesium tallow sulfate and having an average of about 12.4 carbon atoms per molecule. About 280 cc. of foam were produced.

*Example XIII*

The procedure of Example VI was repeated with the exception of substituting for the commercial sodium lauryl sulfate a mixture consisting of about 30% lithium i-propyl sulfate and about 70% lithium arachidyl sulfate and having an average of about 15 carbon atoms per molecule. A foam production of 250 cc. was obtained.

*Example XIV*

The procedure of Example VI was repeated with the exception of substituting for the commercial sodium lauryl sulfate a mixture consisting of about 12% ammonium n-decyl sulfate and about 88% ammonium cetyl sulfate and having an average of about 15 carbon atoms per molecule. A foam production of 230 cc. was obtained.

*Example XV*

In order to determine the effects of varying the amount of emulsifier employed in emulsion polymerizations, the procedure of Example VI was repeated with the exception of utilizing smaller amounts of emulsifier than 2 parts by weight per hundred parts monomeric material. The tests were conducted employing (1) commercial sodium lauryl sulfate which was designated emulsifier A and (2) the surface-active composition of the invention containing sodium methyl, n-butyl and tallow sulfates described in Example II which was designated emulsifier B. The various amounts of the emulsifiers employed, the foam production observed, and the character of the final dispersions resulting in each case are set forth in Table 9.

TABLE 9

| Emulsifier | Amount parts by weight | Foam Volume (cc.) | Character of Final Dispersion |
| --- | --- | --- | --- |
| Emulsifier A | 1.25 | (¹) | (¹). |
| Do | 1.50 | 270 | Coagulation.² |
| Do | 2.0 | 320 | Uniform. |
| Emulsifier B | 0.75 | 100 | Do. |
| Do | 1.50 | 180 | Do. |
| Do | 2.0 | 220 | Do. |

¹ Polymerization failed.
² A significant portion of the polymeric material in the dispersion coagulated and a filtration step was necessary in order to obtain a uniform polymer dispersion.

*Example XVI*

The procedure of Example VI was repeated with the exception of substituting, in turn, sodium cetyl sulfate, sodium stearyl sulfate, and sodium behenyl sulfate for commercial sodium lauryl sulfate. In each case the polymer dispersion resulting thereby was observed to undergo gel formation in a relatively short period after the polymer dispersions were cooled and adjusted as to pH.

DETERGENT COMPOSITION

The detergent composition which satisfies the objects of the present invention comprises (1) a high cleaning, low foaming surface-active composition comprising a water-soluble mixture of salts of sulfated aliphatic hydrocarbon alcohols having an average carbon atom content per molecule of from about 7 to about 22 and consisting essentially of: (a) a lower molecular weight constituent consisting of at least one salt of a sulfated aliphatic alcohol having from 1 to about 10 carbon atoms and (b) a higher molecular weight constituent consisting of at least one salt of a sulfated aliphatic alcohol having at least 16 carbon atoms, said lower molecular weight constituent being present in an amount in the range of from about 5 to 85 mol percent of said mixture; and (2) an alkali metal polyphosphate.

The salts of sulfated aliphatic alcohols contemplated for utilization in the present invention are those aliphatic sulfate salts wherein the aliphatic chain is a hydrocarbon aliphatic chain. Aliphatic sulfate salts referred to hereinafter in the specification and claims will be understood to be aliphatic hydrocarbon sulfate salts.

The lower molecular weight aliphatic sulfate salts contemplated for utilization in the invention are the salts of the sulfated aliphatic alcohols containing from one to about 10 carbon atoms. These lower aliphatic sulfates suitably may be straight or branched in chain structure and saturated or unsaturated in nature. Although sulfate salts of secondary or tertiary alcohols suitably may be utilized, salts of the sulfated primary aliphatic alcohols provide the preferred lower weight components of the sulfate salt mixtures employed in the invention.

The particular lower aliphatic sulfate salts which are contemplated for utilization are the salts formed from suitable sulfated lower aliphatic alcohols and inorganic and organic proton acceptors. Suitable salts include the salts of alkali metals such as lithium, sodium, and potassium; salts of alkaline earth metals such as calcium and magnesium; and salts of nitrogen-containing compounds such as ammonia, diethanolamine, triethanolamine, pyridine, morpholine and diethylcyclohexylamine. Specific compounds which are contemplated for utilization as the lower molecular weight sulfate salts include, without limitation, sodium methyl sulfate, triethanolamine methyl sulfate, sodium ethyl sulfate, potassium n-propyl sulfate, sodium n-butyl sulfate, lithium i-butyl sulfate, potassium n-amyl sulfate, sodium 2-methylbutyl sulfate, potassium n-hexyl sulfate, diethanolamine n-heptyl sulfate, sodium 2-ethylhexyl sulfate, sodium 1-methyl-1-ethylhexyl sulfate, lithium n-decyl sulfate, magnesium n-decyl sulfate, and sodium n-decyl sulfate. The lower aliphatic sulfate salts may be employed singly or in combination.

The higher molecular weight aliphatic sulfate salts which are contemplated for utilization in the surface-active compositions of the present invention are salts of sulfated higher aliphatic alcohols having at least about 16, preferably from about 16 to about 30, carbon atoms in the aliphatic chain, which salts are water-soluble per se, or are soluble when employed in combination with the low molecular weight constituent of the mixtures of the invention. The higher aliphatic sulfate salts may be straight or branched chain in structure and contain saturated or unsaturated carbon chains.

The higher molecular weight components of the aliphatic sulfate salt mixtures of the invention are the salts formed by reaction of suitable sulfated higher aliphatic alcohols and inorganic and organic proton acceptors. Such salts include the salts of alkali metals such as lithium, sodium, and potassium; salts of the alkaline earth metals such as calcium and magnesium; and salts of nitrogen-containing compounds such as ammonia, diethanolamine, triethanolamine, pyridine, morpholine and diethylcyclohexylamine. Specific salts which may be employed as the higher aliphatic sulfate salt in the compositions of the invention include, without limitation, sodium cetyl sulfate, ammonium cetyl sulfate, triethanolamine cetyl sulfate, sodium i-hexadecyl sulfate, sodium stearyl sulfate, lithium stearyl sulfate, magnesium stearyl sulfate, diethanolamine stearyl sulfate, sodium i-eicosyl sulfate, sodium oleyl sulfate, potassium arachidyl sulfate, potassium melissyl sulfate, and sodium behenyl sulfate. The higher aliphatic sulfates may be employed singly or in combination in surface-active compositions of the invention. Suitable mixtures are derived from vegetable or animal origins such as coconut oil, sperm oil, tall oil and tallow fats. Suitable higher aliphatic alcohols may also be prepared synthetically, such as from petrochemicals by the oxo-reaction.

The aliphatic sulfate salts contemplated for utilization in the invention are produced by the sulfation of suitable aliphatic hydrocarbon alcohols in accordance with any of the conventional sulfation processes such as those employing chlorosulfonic acid, sulfuric acid, and the like, followed by neutralization of the sulfated derivatives with a base. The lower and higher molecular weight components of the sulfate salt mixtures of the invention may be produced by the sulfation of the aliphatic alcohol derivatives separately prior to their combination. Alternatively, the lower and higher molecular weight alcohols to be employed to produce the surface-active compositions of the invention initially are combined in the requisite amounts, and the resulting mixture then is subjected to sulfation conditions. In a preparation wherein sulfation is carried out on a mixture of the lower and higher molecular weight alcohols, an excess of the more volatile alcohols equal to the amounts and which are lost during the sulfation by evaporation should be introduced in order to ensure the desired final composition.

The lower and higher molecular weight aliphatic sulfate salts are combined in such proportions as to provide a mixture of aliphatic hydrocarbon alcohol derivatives having an average carbon atom content per molecule in the range of from about 7 to about 22, preferably from about 9 to about 16, and a lower aliphatic sulfate salt content in the range of from about 5 to about 85 mol percent, preferably from about 10 to about 75 mol percent.

Aliphatic sulfate salt mixtures employed in the invention wherein the amount of lower aliphatic sulfate salt present is between about 5 and about 10 mol percent display dispersing properties which are comparable or slightly better than conventionally employed alkyl sulfate salts. These aliphatic sulfate salt mixtures utilized in the invention, however, exhibit a greatly reduced tendency to foam as compared to the alkyl sulfate salts heretofore available, such as commercial sodium lauryl sulfate.

The sulfate salt mixtures suitable for utilization in the invention containing over about 10 mol percent of the lower aliphatic salt constituent, in addition to having valuable low foaming characteristics, have improved surface-active properties.

The mixtures of aliphatic sulfate salts employed in the dispersions of the invention have a difference between the average carbon atom content per molecule of the higher molecular weight component thereof and the average carbon atom content per molecule of the lower molecular weight component thereof of at least about 6. For salt mixtures wherein the cation is the same, the surface-active properties, especially the low-foaming properties, become progressively better as the spread in the average carbon atom content per molecule between the lower and higher molecular weight constituents is increased. Surface-active compositions which have the more preferred dispersing characteristics are those in which the spread in the average carbon atom content per molecule between the lower and higher molecular weight constituents is in the range of from about 8 to about 21.

Mixtures formed from the lower and higher molecular weight aliphatic sulfate salts employed in the invention and characterized by compositions which fall outside of the recited ranges do not exhibit the desired valuable surface-active properties. Such sulfate salt mixtures fail to provide detergents having the desired depressed foaming characteristics. Thus, the experience of the prior art has been that combinations of alkyl sulfates result in detergents having considerably increased foaming properties as taught, for example, by Flett and Toone in U.S. 2,401,726.

The invention having been generally described, the following examples are given to specifically illustrate various embodiments of the invention. To demonstrate the general utility of the compositions of the invention to combine high detergency with low foaming, a standard detergent composition was made up (all parts by weight) consisting of:

| | Parts |
|---|---|
| Sodium tripolyphosphate | 40 |
| Silicate (having a ratio of $Na_2O:SiO_2$ of 1:2) | 12 |
| Sodium carbonate | 20 |
| Sodium sulfate | 10 |
| Detergent | 16 |

The following examples of detergent formulations utilized in the above standard detergent composition are given for illustration purposes only and are not intended in any way to limit the scope of the invention. Unless otherwise specified, the percentage of an ingredient in a composition referred to in the examples is in mol percent. In the examples wherein it is indicated that a sulfate salt mixture contains a "tallow" sulfate salt, it will be understood the reference is to a cetyl-stearyl sulfate combination which has a mole ratio of $C_{16}$ to $C_{18}$ constituents of about 0.54 and has been derived from hydrogenated tallow.

*Example XVII*

| | Percent |
|---|---|
| Sodium methyl sulfate | 10 |
| Sodium tallow sulfate | 90 |

*Example XVIII*

| | |
|---|---|
| Sodium ethyl sulfate | 9 |
| Sodium tallow sulfate | 91 |

*Example XIX*

| | |
|---|---|
| Sodium n-decyl sulfate | 66 |
| Sodium tallow sulfate | 34 |

*Example XX*

| | |
|---|---|
| Sodium n-decyl sulfate | 50 |
| Sodium cetyl sulfate | 50 |

*Example XXI*

| | |
|---|---|
| Sodium n-propyl sulfate | 60 |
| Sodium tallow sulfate | 40 |

*Example XXII*

| | |
|---|---|
| Sodium 2-ethylhexyl sulfate | 47 |
| Sodium tallow sulfate | 53 |

*Example XXIII*

| | |
|---|---|
| Sodium methyl sulfate | 11 |
| Sodium n-butyl sulfate | 18 |
| Sodium tallow sulfate | 71 |

*Example XXIV*

| | |
|---|---|
| Lithium i-propyl sulfate | 30 |
| Lithium arachidyl sulfate | 70 |

*Example XXV*

| | |
|---|---|
| Sodium n-butyl sulfate | 74 |
| Sodium tallow sulfate | 26 |

Example XXVI

| | |
|---|---|
| Sodium ethyl sulfate | 51 |
| Sodium tallow sulfate | 49 |

Example XXVII

| | |
|---|---|
| Magnesium n-decyl sulfate | 66 |
| Magnesium tallow sulfate | 34 |

Example XXVIII

| | |
|---|---|
| Sodium methyl sulfate | 38 |
| Sodium arachidyl sulfate | 62 |

Example XXIX

| | |
|---|---|
| Sodium ethyl sulfate | 31 |
| Sodium oleyl sulfate | 69 |

Example XXX

| | |
|---|---|
| Sodium n-butyl sulfate | 83 |
| Sodium behenyl sulfate | 17 |

Example XXXI

| | |
|---|---|
| Magnesium ethyl sulfate | 12 |
| Magnesium cetyl sulfate | 88 |

Example XXXII

| | |
|---|---|
| Lithium i-propyl sulfate | 30 |
| Lithium behenyl sulfate | 70 |

Example XXXIII

| | |
|---|---|
| Sodium methyl sulfate | 5 |
| Sodium tallow sulfate | 95 |

Example XXXIV

| | |
|---|---|
| Sodium n-butyl sulfate | 40 |
| Sodium arachidyl sulfate | 60 |

Example XXXV

| | |
|---|---|
| Ammonium n-decyl sulfate | 12 |
| Ammonium cetyl sulfate | 88 |

Example XXXVI

| | |
|---|---|
| Sodium n-butyl sulfate | 70 |
| Sodium behenyl sulfate | 30 |

Each of the standard detergent compositions containing the detergent formulation of each example as the detergent in the composition, when used in a horizontally rotatable drum-type home washing machine to wash naturally soiled clothes, gives excellent heavy duty cleansing efficiency while depressing the foaming characteristics of the detergent. As a more definitive test of the ability of the detergent formulations to depress the foaming characteristics of the combination, 3% by weight of each composition is added to 60 cc. of tap water and the solution introduced into a graduated cylinder. The cylinder is placed in a vertical position in a rack which is rotatable in a vertical plane. The rack is rotated at 50 r.p.m. for one minute to subject the solution to agitation. At the end of the agitation period the cylinder is removed from the rack and the total volume of the material in the cylinder is recorded. As a control, a similar solution is made up containing commercial sodium lauryl sulfate as the detergent in the detergent composition. The amount of the volume attributable to foam is determined by subtracting the original volume (60 cc.) from the recorded volume. As compared to the control, the detergent compositions of Examples XVIII, XXI, XXV, XXVI, XXIX, XXX, XXXII, XXXIV, and XXXVI reduce the foam level by about 50% and the detergent compositions of Examples XVII, XIX, XX, XXII, XXIII, XXIV, XXVII, XXVIII, XXXI, XXXIII and XXXV reduce the volume of foam by about one-third when compared to the foam volume of the control.

An aqueous detergent composition is made up consisting of 20 parts of detergent composition, 5 parts tetrasodium pyrophosphate and 75 parts water. The detergent formulations of Examples XVIII, XXIX, and XXXVI are used in this formulation in a commercial dishwashing machine to clean naturally soiled dishes, glasses, and silverware. In each case, as compared to a control using commercial sodium lauryl sulfate in the same aqueous detergent composition, the compositions of the invention give excellent heavy duty cleansing efficiency not only with regard to removal of soil, but also with regard to no dulling of the gloss on fine china and soft glassware and no spotting of the glassware and metal ware. The aqueous detergent compositions of the invention also show substantially reduced foaming.

Detergent compositions according to the invention may contain miscellaneous ingredients such as optical brighteners, anti-redeposition agents such as carboxymethyl cellulose, coloring dyes, perfumes, etc., which are well known constituents in detergent compositions.

While tetrasodium pyrophosphate and sodium tripolyphosphate have been used in the examples, it is not intended that the detergent compositions of the invention be limited with respect thereto. Any of the various alkali metal metaphosphates, pyrophosphates and polyphosphates known to those skilled in the art as builders for detergent compositions may be used herein and are referred to generically in the specification and claims as "alkali metal polyphosphates." In the case of aqueous detergent compositions, the composition will conventionally contain from about 2 to about 10 percent of a suitable alkali metal polyphosphate. In the case of the solid detergent compositions, which may be in the form of a flake, granule, powder, etc., the ratio of alkali metal polyphosphate to detergent may vary from about 1 to 1 to about 6 to 1, while a ratio of from 3 to 1 to about 4 to 1 is particularly preferred.

Tests were run to compare the foaming characteristics of sodium lauryl sulfate, sodium methyl sulfate:tallow sulfate mixtures, and methyl sulfate:dodecyl benzene sulfonate mixtures. Aqueous solutions of different concentrations of the mixtures were prepared in water characterized by a hardness of 300 p.p.m.; a measured 60 cc. portion of each solution was introduced into a graduated cylinder, and the cylinder was placed in a vertical position in a rack which was rotatable in a vertical plane. The rack was rotated at 50 r.p.m. for one minute to subject the solution to agitation. At the end of the agitation period the cylinder was removed from the rack and the total volume of the material in the cylinder was recorded. The amount of the volume attributable to foam was determined by subtracting the original volume, 60 cc., from the recorded volume.

The following data were obtained from said tests:

| | Mol, Percent | Conc. Percent | Foam Volume (cc.) |
|---|---|---|---|
| Sodium lauryl sulfate | | 0.1 | 15 |
| Do | | 0.25 | 296 |
| Do | | 0.50 | 300 |
| Sodium methyl sulfate:tallow sulfate | 26:74 | 0.1 | 0 |
| Do | 26:74 | 0.2 | 0 |
| Do | 26:74 | 0.4 | 64 |
| Methyl sulfate:doedcyl benzene sulfonate | 26:74 | 0.1 | 250 |
| Do | 26:74 | 0.2 | 300 |
| Do | 26:74 | 0.4 | 300 |

Since modifications of the described embodiments which do not depart from the scope of the invention will suggest themselves to those skilled in the art, it is intended that the invention be limited only by the scope of the appended claims.

We claim:

1. A surface-active composition consisting essentially of a water-soluble mixture of salts of sulfated aliphatic hydrocarbon alcohols having an average carbon atom content per molecule of from about 7 to about 22, said mixture consisting essentially of (a) a lower molecular weight constituent consisting of at least one salt of a sulfated aliphatic alcohol having from 1 to 4 carbon atoms and (b) a higher molecular weight constituent comprising at least one salt of a sulfated aliphatic alcohol having from about 16 to about 30 carbon atoms, said lower molecular weight constituent being present in an amount of at least about 5 up to about 85 mol percent of said mixture.

2. The surface-active composition of claim 1 wherein said lower molecular weight constituent comprises a plurality of aliphatic sulfate salts.

3. The surface-active composition of claim 1 wherein said higher molecular weight constituent comprises a plurality of aliphatic sulfate salts.

4. The surface-active composition of claim 1 wherein said higher molecular weight aliphatic sulfate salt contains from about 16 to about 22 carbon atoms.

5. The surface-active composition of claim 1 wherein the average carbon atom content per molecule of said mixture is in the range of from about 9 to about 16.

6. A surface-active composition consisting essentially of a water-soluble mixture of salts of sulfated aliphatic hydrocarbon alcohols having an average carbon atom content per molecule in the range of from about 9 to about 16, said mixture consisting essentially of (a) a lower molecular weight constituent consisting of at least one salt of a sulfated aliphatic alcohol having from 1 to 4 carbon atoms and (b) a higher molecular weight constituent consisting of at least one salt of a sulfated aliphatic alcohol having from about 16 to about 30 carbon atoms, said lower molecular weight constituent being present in an amount of at least about 10 to about 85 mol percent of said mixture.

7. The surface-active composition of claim 6 wherein said lower molecular weight constituent comprises a methyl sulfate salt and said higher molecular weight constituent comprises a stearyl sulfate salt.

8. The surface-active composition of claim 6 wherein said lower molecular weight constituent comprises an ethyl sulfate salt and said higher molecular weight constituent comprises an oleyl sulfate salt.

9. The surface-active composition of claim 6 wherein said lower molecular weight constituent comprises a propyl sulfate salt and said higher molecular weight constituent comprises a cetyl sulfate salt.

10. The surface-active composition of claim 6 wherein said lower molecular weight constituent comprises a butyl sulfate salt and said higher molecular weight constituent comprises a behenyl sulfate salt.

11. The surface-active composition of claim 6 wherein said lower molecular weight constituent comprises a methyl sulfate salt and said higher molecular weight constituent comprises a behenyl sulfate.

12. The surface-active composition of claim 6 wherein said lower molecular weight constituent comprises a propyl sulfate salt and said higher molecular weight constituent comprises an arachidyl sulfate salt.

13. An alkyl sulfate detergent composition characterized by low foaming, detergency, and insensitivity to high temperatures consisting essentially of (1) as the primary detergent a water soluble mixture of salts of sulfated aliphatic-hydrocarbon alcohols having an average carbon atom content per molecule of from about 7 to about 22, said mixture consisting essentially of (a) a lower molecular weight constituent consisting of at least one salt of a sulfated aliphatic alcohol having from 1 to about 10 carbon atoms, and (b) a higher molecular weight constituent consisting of at least one salt of a sulfated aliphatic alcohol having from about 16 to about 30 carbon atoms, said lower molecular weight constituent being present in an amount in the range of from about 5 to about 85 mol percent of said mixture, and (2) an alkali metal polyphosphate builder.

14. The detergent composition according to claim 13 wherein said lower molecular weight constituent comprises a plurality of aliphatic sulfate salts.

15. The detergent composition according to claim 13 wherein said higher molecular weight constituent comprises a plurality of aliphatic sulfate salts.

16. The detergent composition according to claim 13 wherein the average carbon atom content per molecule of said mixture is in the range of from about 9 to about 16.

17. The detergent composition according to claim 13 wherein said lower molecular weight constituent is present in an amount in the range of from about 10 to about 75 mol percent of said mixture.

18. The detergent composition according to claim 13 wherein the weight ratio of said alkali metal polyphosphate builder to said mixture of sulfated salts is in the range of from about 1:1 to about 6:1.

19. The detergent composition according to claim 13 wherein said alkali metal polyphosphate builder is selected from the group consisting of tetrasodium pyrophosphate, sodium tripolyphosphate, and mixtures thereof.

20. An alkyl sulfate detergent composition characterized by low foam, detergency, and insensitivity to high temperatures consisting essentially of (1) as the primary detergent a water-soluble mixture of salts of sulfated aliphatic hydrocarbon alcohols having an average carbon atom content per molecule in the range of from about 9 to about 16, said mixture consisting essentially of (a) a lower molecular weight constituent consisting of at least one salt of a sulfated aliphatic alcohol having from 1 to about 10 carbon atoms, and (b) a higher molecular weight constituent consisting of at least one salt of a sulfated aliphatic alcohol having from about 16 to about 30 carbon atoms, said lower molecular weight constituent being present in an amount in the range of from about 10 to about 75 mol percent of said mixture, and (2) an alkali metal polyphosphate builder.

21. The detergent composition according to claim 20 wherein said lower molecular weight constituent comprises a methyl sulfate salt and said higher molecular weight constituent comprises a stearyl sulfate salt.

22. The detergent composition according to claim 20 wherein said lower molecular weight constituent comprises an ethyl sulfate salt and said higher molecular weight constituent comprises an oleyl sulfate salt.

23. The detergent composition according to claim 20 wherein said lower molecular weight constituent comprises a propyl sulfate salt and said higher molecular weight constituent comprises a cetyl sulfate salt.

24. The detergent composition according to claim 20 wherein said lower molecular weight constituent comprises a butyl sulfate salt and said higher molecular weight constituent comprises a behenyl sulfate salt.

25. The detergent composition according to claim 20 wherein said lower molecular weight constituent comprises a methyl sulfate salt and said higher molecular weight constituent comprises a behenyl sulfate salt.

26. The detergent composition according to claim 20 wherein said lower molecular weight constituent comprises an octyl sulfate salt and said higher molecular weight constituent comprises a stearyl sulfate salt.

References Cited by the Examiner

UNITED STATES PATENTS

| | | | |
|---|---|---|---|
| 2,033,276 | 3/1936 | Clarke et al. | 260—730 |
| 2,114,043 | 4/1938 | Bertsch | 260—458 |
| 2,326,772 | 8/1943 | Flett | 252—161 |
| 2,742,435 | 4/1956 | Korpi et al. | 252—161 |
| 3,030,312 | 4/1962 | Mills | 252—161 |

JULIUS GREENWALD, Primary Examiner.